July 21, 1959
J. G. IMPARATO
2,895,202
YOKE-TYPE CLAMPS
Filed Sept. 17, 1958
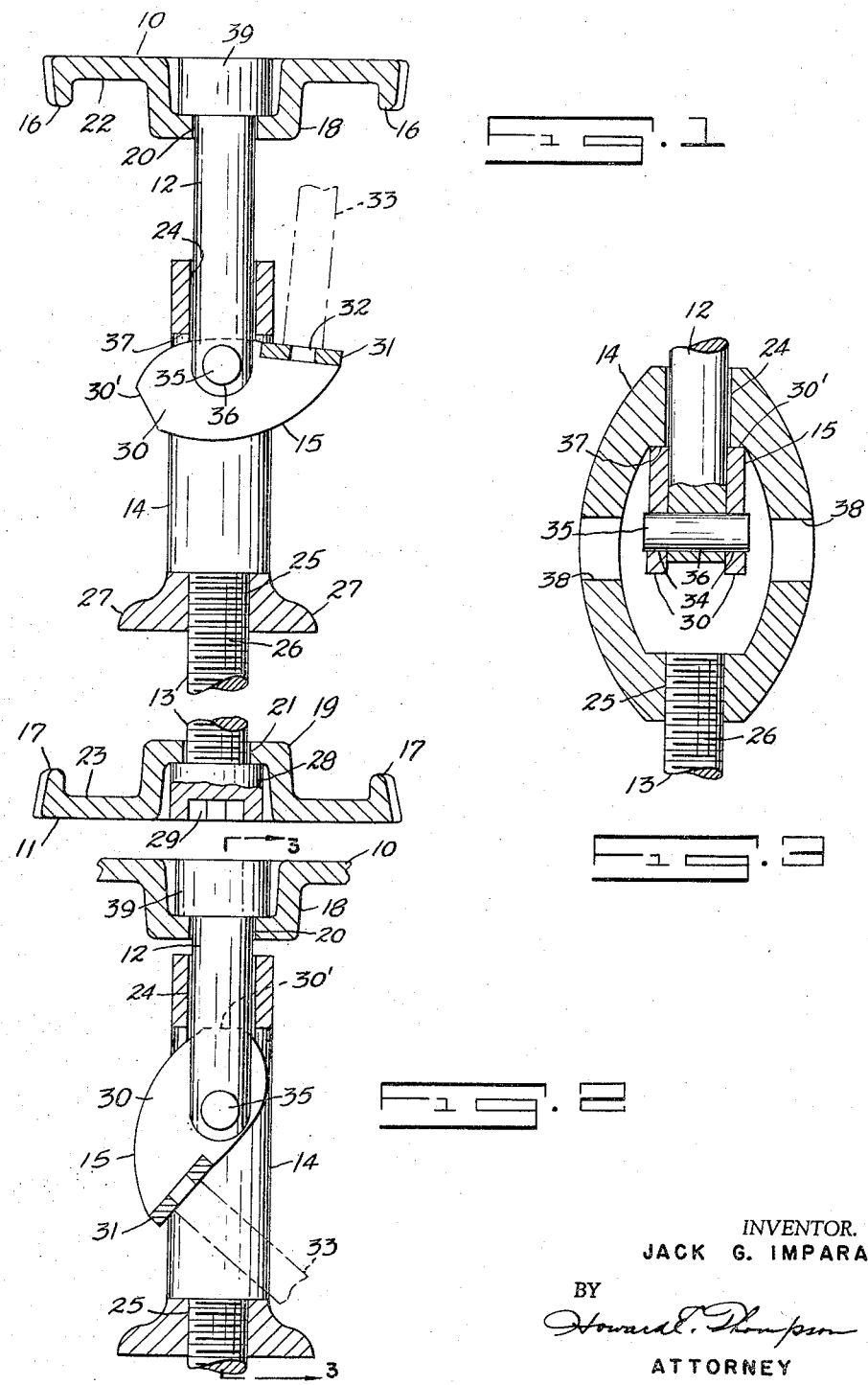
INVENTOR.
JACK G. IMPARATO
BY
Howard T. Thompson
ATTORNEY

United States Patent Office 2,895,202
Patented July 21, 1959

2,895,202

YOKE-TYPE CLAMPS

Jack G. Imparato, Brooklyn, N.Y.

Application September 17, 1958, Serial No. 761,514

7 Claims. (Cl. 24—263)

This invention relates to clamps for use in securing two adjacent products, such as drums, together for collective handling of the drums. More particularly, the invention deals with a structure of the character described, wherein two clamp plates are moved into operative engagement by actuation of a cam operating in a yoke, wherein the yoke is adjustably coupled with one plate and a bolt extends into and moves relatively to the yoke, the cam being pivotally coupled with said bolt and operatively engaging the yoke to draw said plates together.

The novel features of the invention will be best understood from the following description, when taken together with the accompanying drawing, in which certain embodiments of the invention are disclosed and, in which the separate parts are designated by suitable reference characters in each of the views and, in which:

Fig. 1 is a longitudinal broken sectional view through a clamp made according to my invention, with the clamp plates illustrated in a non-use position and, further, with the clamp shown in open position.

Fig. 2 is a view, similar to Fig. 1, showing only part of the construction and illustrating the clamp in its closed or operative position; and Fig. 3 is a section on the line 3—3 of Fig. 2, with parts of the construction shown in elevation.

My improved clamp comprises two clamp plates 10 and 11, two rod members or bolts 12 and 13, a yoke 14 and an actuating cam 15.

The plates 10 and 11 are generally of the same contour and comprise curved end flanges 16 on the plate 10 and 17 on the plate 11. The plates 10 and 11 include, centrally thereof, inwardly pressed socket portions 18 and 19, respectively, apertured, as seen at 20 and 21, respectively, to receive the rod members or bolts 12, 13. In order to simplify illustrations, the clamp plates 10 and 11 have been shown in Figs. 1 and 2 of the drawing in a position 90° to the normal position thereof, it being understood that these plates are free to rotate on their supports. In other words, when the plates are in position engaging the articles or drum to be clamped together, the flanges of the plates would be 90° to the showing in these figures.

At this time, it may be well to point out that, in engaging articles such, for example, as the flanged ends of the drums, these ends engage the surfaces 22, 23, respectively, of the plates 10 and 11 inwardly of the flanges 16, 17, the curvatures of the flanges generally conforming to the contour of the drums.

The yoke 14 has apertured ends, as at 24 and 25, the bolt 12 operating in the aperture 24; whereas, the bolt 13 has an elongated thread 26 for adjustable engagement with the aperture 25, which is correspondingly threaded. This end of the yoke also includes flared side bearing portions 27 to be engaged by fork lifts in collectively lifting and handling the drums or other articles coupled together by the clamp.

The free end, or what may be termed the lower end of the bolt 13, includes a head 28, having a hexagon or other socket 29 in its outer surface to facilitate rotation of the bolt 13 in adjusting the position of the yoke 14 therewith in control of spacing between the plates 10 and 11, when in operative position. This adjustment may be sufficient to deal with articles of varying sizes or spacings between upper and lower ends thereof. It will appear that the head 28 is completely contained within the socket 19.

The cam 15 is yoke-shaped in form, in other words, includes eccentric side plates 30 joined by a crosshead 31, apertured, as seen at 32, to receive an actuating tool or rod, the latter being indicated, in part, in dot-dash lines at 33. The rod 33 does not constitute a part of the cam, but is simply a tool moved into engagement with the cam for moving the same from the inoperative position of Fig. 1 to the operative position of Fig. 2.

The eccentric sides 30 terminate in a flat, as at 30′. The eccentric side plates 30 of the cam 15 have, as noted clearly in Fig. 3 of the drawing, apertures 34 for the reception of a pivot pin 35. The bolt 12 has, at its lower end, an aperture 36, in which the pin 35 is mounted and this establishes the pivotal coupling of the cam, so that the eccentric surfaces of the side plates 30 of the cam can engage the inner surface 37 of the end of the yoke 14 having the aperture 24 therein, as is clearly noted in Figs. 1 and 2 of the drawing. It will, thus, be apparent that, as the cam 15 is moved from the position of Fig. 1 to the position of Fig. 2, the bolt 12 is drawn downwardly through the yoke and the yoke 14 is moved upwardly on the bolt, bringing the parts substantially to the position shown in Fig. 2, in which position the flat 30′ is in engagement with the surface 37, thus maintaining the parts in operative position.

It will appear, from a consideration of Fig. 3 of the drawing, that the sides of the yoke are apertured, as seen at 38, to permit assemblage of the pivot pin 35 with the bolt 12 and cam 15.

It will be understood that, after the cam 15 has been moved to the position of Fig. 2 of the drawing, the operating tool 33 is removed and would again be replaced, as and when it is desirable to uncouple the two articles or drums while returning the clamp from the position of Fig. 2 of the drawing to the position of Fig. 1.

The bolt 12 includes a head 39 which seats in the socket 18 in a manner similar to the head 28. Slight clearances will be provided for the bolt 12 in the apertures 24 and for the bolt 13 in the aperture 21. The showings of these clearances are exaggerated in the accompanying drawing.

Having fully described my invention, what I claim as new and desire to secure by Letters Patent is:

1. A clamp of the character described, comprising a pair of flanged clamp plates, including central socket portions, the socket portions being apertured to receive rod members, a yoke arranged upon adjacent end portions of said rod members, means, at the other ends of the rod members, for retaining the plates against displacement therefrom, and an actuating cam arranged within the yoke and operatively engaging the yoke and one of said rod members in controlling spacing of the clamp plates one with respect to the other.

2. A clamp as defined in claim 1, wherein the other of said rod members is adjustable in said yoke.

3. A clamp as defined in claim 2, wherein one end portion of the yoke includes laterally extending bearing portions.

4. A clamp as defined in claim 2, wherein said last named rod includes a head arranged in the socket of the plate engaged thereby, and said head includes an angular socket in its outer surface.

5. A clamp as defined in claim 1, wherein the cam is yoke-shaped in form and is pivotally coupled with said rod and operatively engages said yoke.

6. A clamp as defined in claim 5, wherein the cam includes a crosshead having an aperture therein.

7. A clamp as defined in claim 6, wherein the other of said rod members is adjustable in said yoke.

No references cited.